United States Patent
Zaguskin et al.

[11] Patent Number: 5,932,846
[45] Date of Patent: Aug. 3, 1999

[54] WIRE HARNESS ASSEMBLY

[75] Inventors: Alex Zaguskin, Farmington Hills; Nathan Moore, Dearborn, both of Mich.

[73] Assignee: UT Automotive Dearborn, Inc., Dearborn, Mich.

[21] Appl. No.: 08/933,386

[22] Filed: Sep. 19, 1997

[51] Int. Cl.$^6$ .................................................. H01B 7/06
[52] U.S. Cl. ........................ 174/70 R; 248/68.1; 361/828
[58] Field of Search ............................... 174/70 R, 72 A, 174/72 C, 135, 71 R, 72 R, 72 TR; 361/826, 827, 828; 248/49, 68.1; 439/34, 503

[56] References Cited

U.S. PATENT DOCUMENTS

| | | | |
|---|---|---|---|
| 2,931,851 | 4/1960 | Sims | 174/72 A |
| 3,210,032 | 10/1965 | Van Slyke | 248/73 |
| 4,065,199 | 12/1977 | Andre et al. | 439/498 |
| 4,591,203 | 5/1986 | Furman | 296/201 |
| 4,907,836 | 3/1990 | Ueda et al. | 296/39.1 |
| 4,918,261 | 4/1990 | Takahashi et al. | |
| 5,160,812 | 11/1992 | Takahashi et al. | 174/135 |
| 5,368,802 | 11/1994 | Wanha | |
| 5,445,436 | 8/1995 | Kemnitz | |
| 5,460,530 | 10/1995 | Toba et al. | 439/34 |
| 5,523,532 | 6/1996 | Leonelli et al. | 200/61.54 |
| 5,535,511 | 7/1996 | Karasik | |
| 5,573,299 | 11/1996 | Masuda | |
| 5,615,851 | 4/1997 | LeBeau | |

*Primary Examiner*—Kristine Kincaid
*Assistant Examiner*—Dhiru R. Patel
*Attorney, Agent, or Firm*—Emch, Schaffer, Schaub & Porcello Co., L.P.A

[57] ABSTRACT

This assembly is for attaching a wire harness to a panel. Preferably, the panel is a motor vehicle interior trim panel and the harness is a flat wire harness. Typically, the panel then attaches to an outside door frame. The assembly includes a motor vehicle interior trim panel having a surface with at least one pin protruding therefrom, and a wire harness having at least one aperture therein, wherein the wire of the harness is adjacent the surface of the trim panel and the pin of the trim panel passes through the aperture of the wire harness. A portion of the pin extends beyond the aperture and that portion of the pin is heat staked to secure the wire harness to the trim panel.

12 Claims, 3 Drawing Sheets

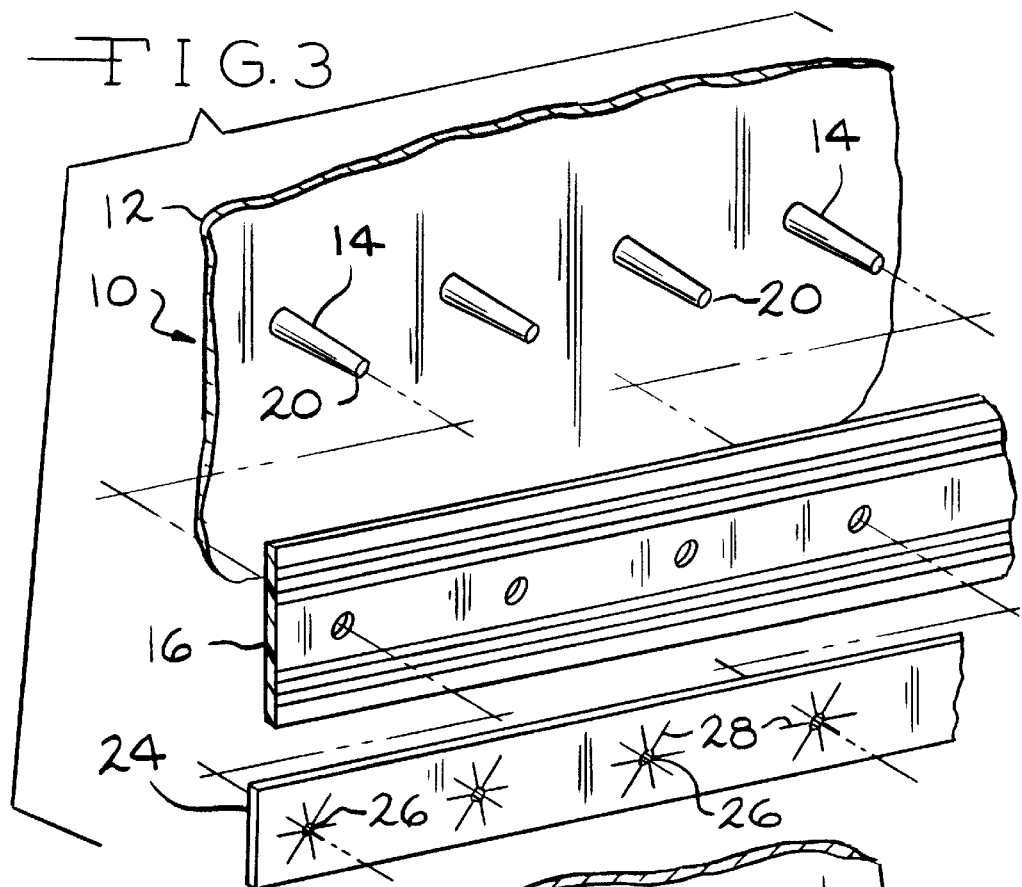
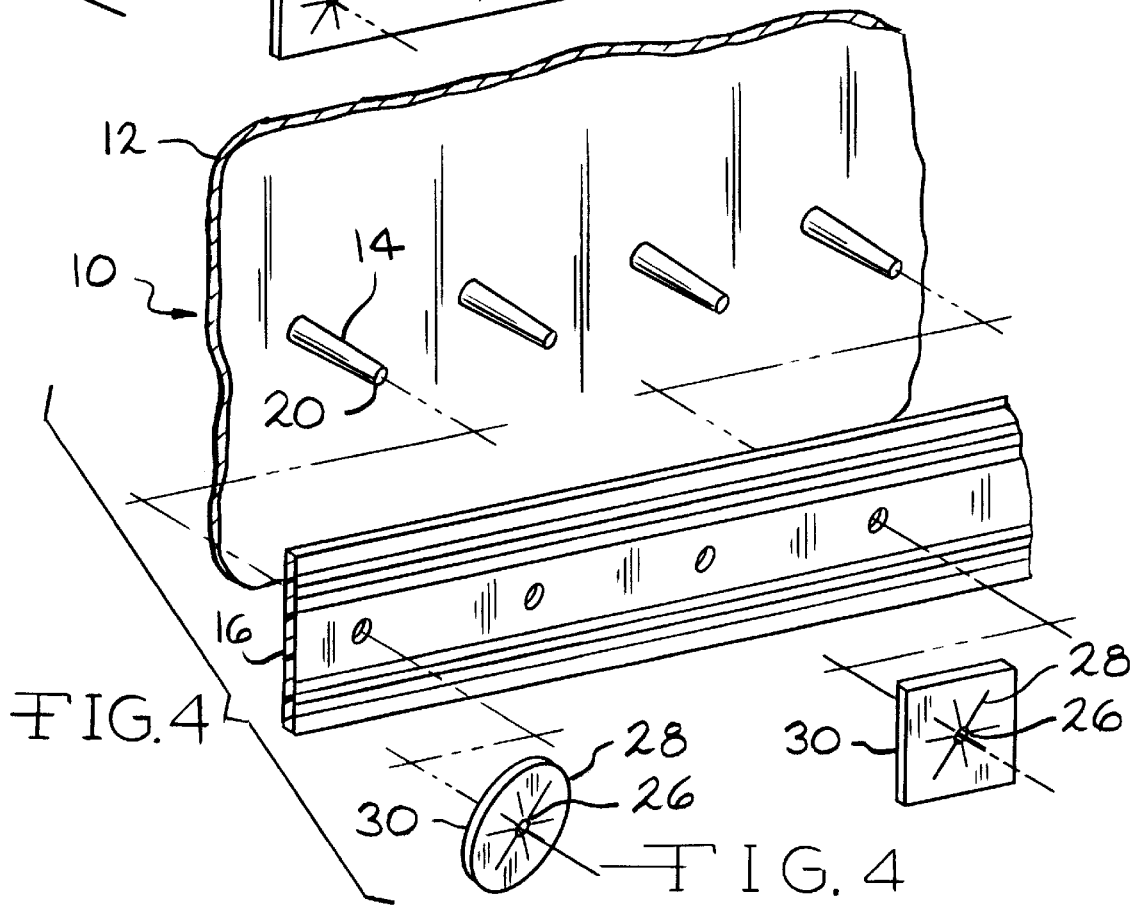

WIRE HARNESS ASSEMBLY

TECHNICAL FIELD

This invention relates to harness assemblies such as flat wire harness assemblies. This assembly minimizes the need for taping, retainers, clips and the like.

BACKGROUND ART

Conventional wire harness attaching units requires taping for binding the wires together. Taping also binds clips or retainers to the harness. Taping flat wire harnesses requires more control and care in order to maintain the flat geometry of the harness. Pulling the tape easily bunches the flat profile into a crumbled bundle. Further, the industry has developed a wide variety of clips which require taping to hold them onto the harness. Industry also has developed other ways to attach the clips to the flat harness. The newer attaching units, however, have their own set of problems. The additional components are more costly, both from a materials and labor standpoint. See U.S. Pat. No. 4,9187,261.

DISCLOSURE OF INVENTION

Our assembly attaches a flat harness to a panel and minimizes or eliminates retainers or clips. Bosses or pins molded into the panel achieve attachment of the flat wire harness without the cost and additional materials that currently has to be done. Concise harness attachments can be achieved with reduced manual labor and additional retention. Additional retention will restrict the movement of the wire harness which will result in minimal vibration and interior automotive cabin rattle and noise.

Harness attachments devices or retainers or extruded bosses will be molded into a panel. The Flat Flexible Cable (FFC) or ribbon cable will be located over the attachment devices or bosses and loaded onto these such that they will protrude through the Flat Flexible Cable (FFC) or ribbon cable. The attachment devices or bosses will then be heat staked or secured with a locking device for a solid connection. The assembly can include multiple FFC's secure to the panel.

BRIEF DESCRIPTION OF THE DRAWINGS

FIG. 3 is a perspective exploded view of this invention showing a locking device with multiple apertures.

FIG. 4 is a perspective exploded view of this invention showing individual locking devices for each pin.

BEST MODE OF CARRYING OUT INVENTION

Preferably, this assembly is for attaching a flat wire harness to a motor vehicle interior trim panel. Typically, the panel then attaches to an outside door frame. The assembly includes a motor vehicle interior trim panel having a surface with at least one pin protruding therefrom, and at least one wire harness having at least one aperture therein, wherein the harness is adjacent the surface of the trim panel and the pin of the trim panel passes through the apertures of the wire harness. A portion of the pin extends beyond the aperture and that portion of the pin is heat staked to secure the wire harness to the trim panel.

While we intended our assembly for securing flat wire harnesses to a motor vehicle interior trim panel, the assembly can secure harnesses, flat or round, in a wide variety of uses. For example, one can use the assembly in other areas of a vehicle, as well as with industrial equipment. One could easily use the assemblies in the electronics industry with computers, televisions, stereo equipment, and the like. One could even use the assemblies in the appliance industry.

In another embodiment, the portion of the pin that extends beyond the aperture engages a locking device that secures the wire harness to the trim panel. The locking device has an aperture with an expandable circumference and the pin of the trim panel is in expanding engagement with the expandable circumference. In one embodiment, a single locking device engages each pin. In other embodiment, the single locking device has a plurality of apertures and engages a plurality of pins. Each pin passes through a separate aperture in the wire harness.

Typically, our assembly fastens to the outer door of a motor vehicle. The wire harness attaches to the outer door side of the trim panel.

Figure 1:
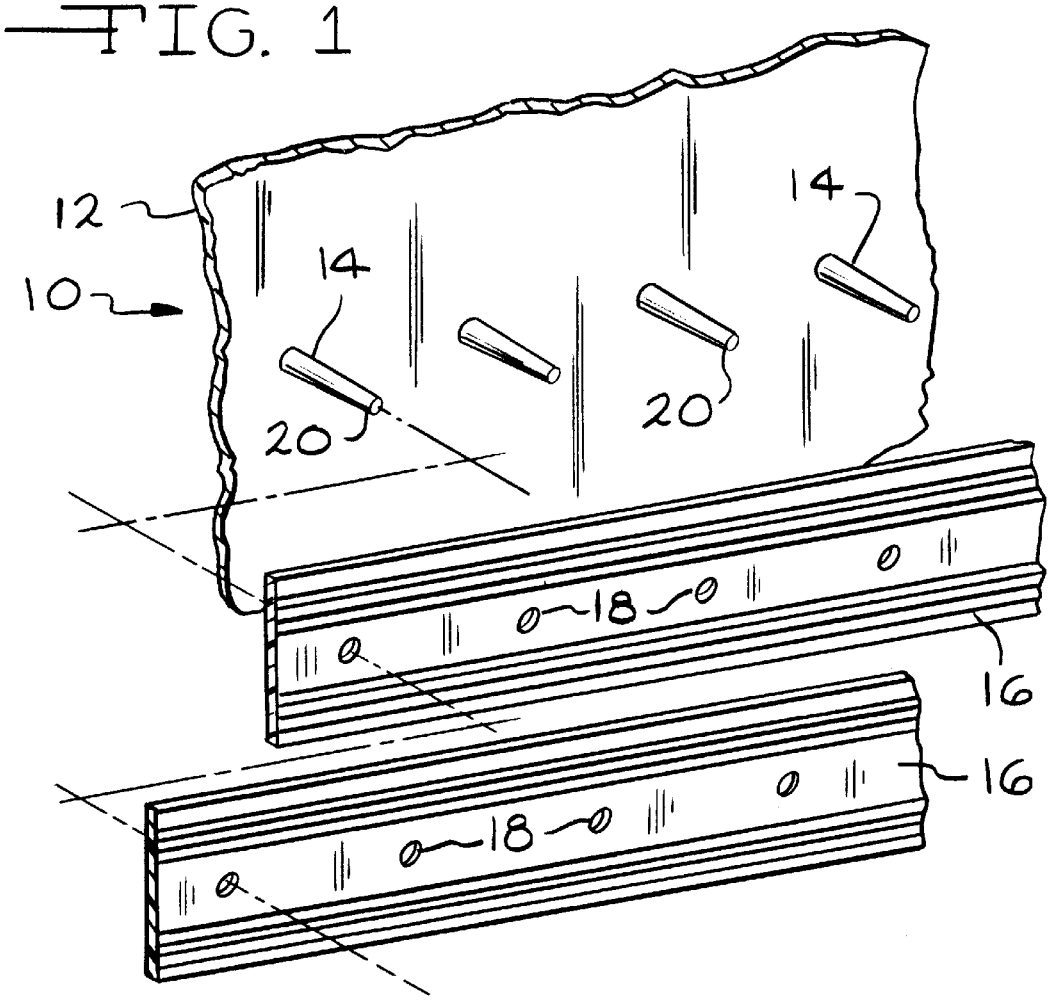
FIG. 1 is a perspective exploded view of the assembly of this invention.

FIG. 1 shows assembly 10 which includes interior trim panel 12, pins 14 protruding therefrom and wire harnesses 16. Wire harnesses 16 includes apertures 18 therethrough. A portion of tips 20 extend through apertures 18 when wire harnesses 16 is in place against trim panel 12.

Figure 2:
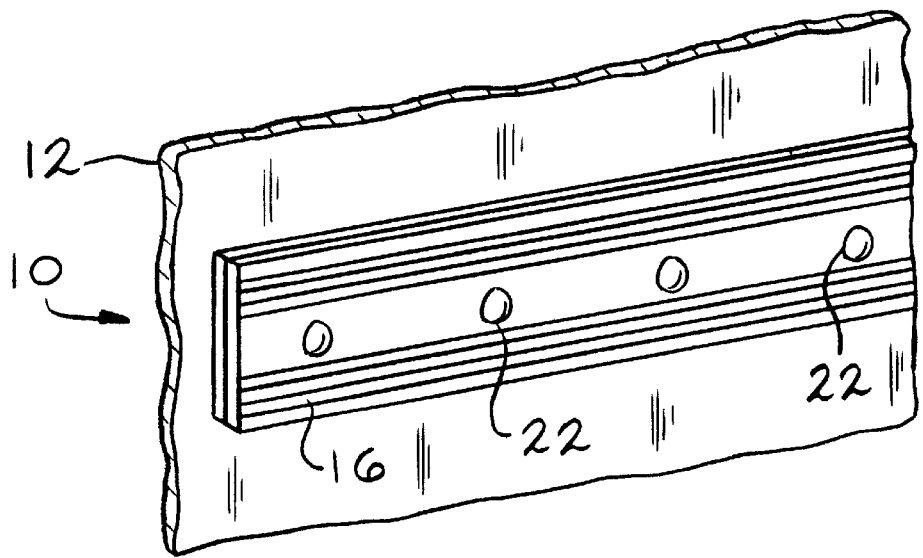
FIG. 2 is a detailed view showing the heat stake of this invention.

FIG. 2 shows tips 20 heat stacked to form heads 22. Heads 22 can have a regular or irregular shape as long as they are larger than apertures 18. As a result, pins 14 and heads 22 hold harnesses 16 against trim panel 12 in a secure manner. Heads 22 also may have a mushroom shaped geometry as shown by head 23.

FIG. 3 shows an embodiment where locking device 24 has multiple apertures 26. Each aperture 26 has an expandable circumference 28.

FIG. 4 shows locking devices 30 taking the place of locking device 24. Device 30 typically is a metal or plastic device with aperture 26 therethrough. Aperture 26 has a regular or irregular circumference 28 which engages tips 20. Tip 20 forces circumferences 28 to expand and hold harnesses 16 to panel 12.

Figure 5:
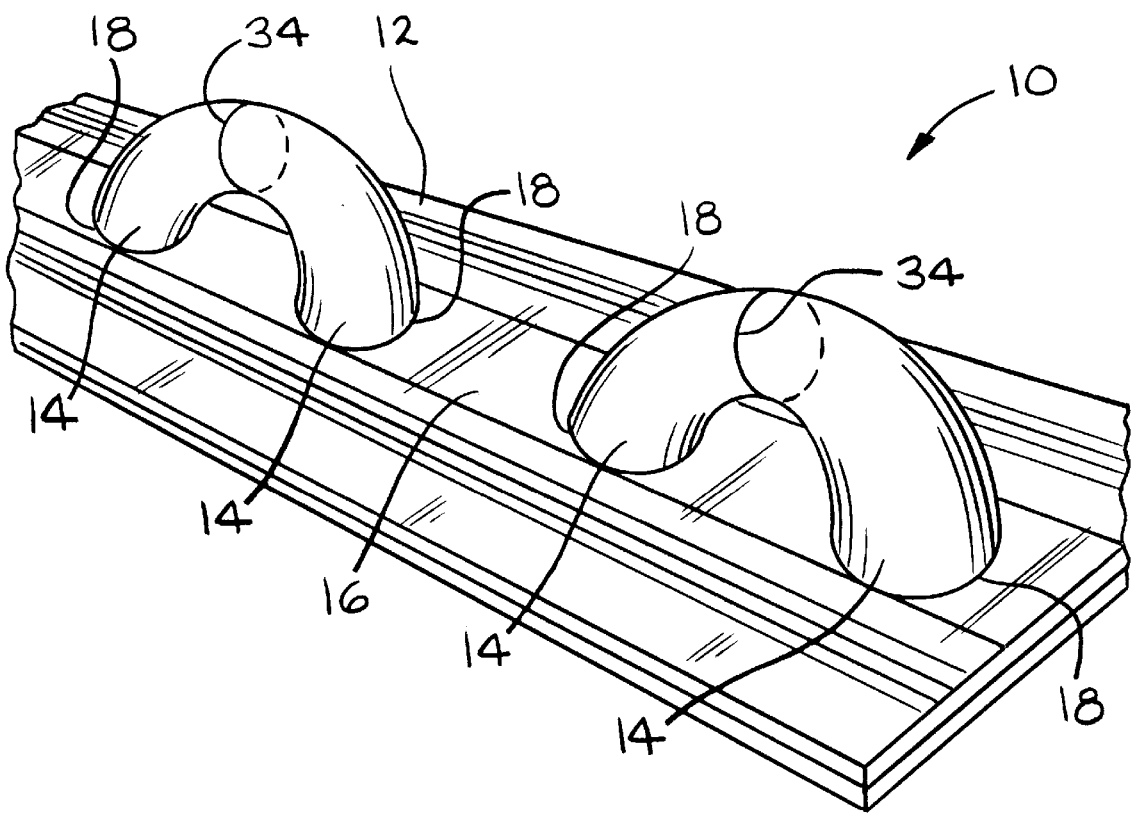
FIG. 5 is a view showing adjacent pins forming a bridge.

FIG. 5 shows adjacent pins 14 heated to form bridge 34 instead of heads 22. In some applications, bridge 34 may be a more effective lock than mushroom shaped head 23.

Wire harness 16 typically is a flat wire harness formed by arranging a plurality of parallel wires in a flat state in synthetic resin layers. An insulating covering covers the conductor of each wire. The synthetic resin for the harness we developed for interior trim panels is a polyester resin. The resin can vary depending on the application. Polyvinyl chloride, nylon, polypropylene, polyethylene and the like also could be used. The wires and the synthetic resin layers are joined integrally through laminating.

Materials for the locking devices and pins include spring steel, as well as a wide variety of synthetic resins, including polyvinyl chloride, polyacetals such as nylon, polyesters and the like.

Preferably, the pins are synthetic resins that we heat stack or fuse the tips to secure the harness to the panel.

Heat staking is a common method for mounting a connector or fastener through a hole. The connector typically is a pin, peg or similar protrusion. In heat staking, hot forming tips press against the ends of the peg and melt and deform them against a surface of a board, so the pegs and connector cannot be removed from the board. In our invention, the board or substrate is the wire harness. Heat stake presses with hot forming tips are known in the art. In our invention, this practice involves providing thermoplastic stakes on the door side of an interior trim panel. The thermoplastic stakes insert through complementary openings along the length of the wire harness. The distal ends of the stakes are heated to form a mushroom type geometry on the end of each stake, thereby locking the harness to the panel.

In another embodiment, pairs of adjacent stakes are heated to form a unitary connecting bridge instead of the mushroom geometry of a single heat stake. In some applications, the bridge may be a more effective lock than the mushroom. We have found both to be effective in our invention.

The thermoplastic polymers we use for pins 14 soften when exposed to heat and return to its original condition when cooled to room temperature. Natural substances that exhibit this behavior are crude rubber and a number of waxes, however, the term is usually applied to synthetics such as polyvinyl chloride, nylons, fluorocarbons, linear polyethylene, polyurethane prepolymer, polystyrene, polypropylene, and cellulosic and acrylic resins. For the most part, our invention employs the synthetics.

Pin 14 can take a wide variety of shapes and often may be called posts, bosses, retainers and the like. The key is that they have the ability to pass through apertures 18.

We claim:

1. A panel having a surface with at least one pin protruding therefrom wherein the pin has a distal end: and a plurality of wire harnesses having at least one aperture therethrough, wherein the plurality of wire harnesses are adjacent the surface of the panel and the distal end of the pin of the panel passes through each of said at least one aperture of the plurality of wire harnesses, wherein a portion of the pin extends beyond said at least one aperture and the portion of the pin extending beyond said at least one aperture is heat staked into a head to secure said plurality of wire harnesses to the panel.

2. An assembly according to claim 1 wherein the pin has the distal end extending beyond each of said at least one aperture of said plurality of harnesses that is head staked into a head having a mushroom shaped geometry larger than said at least one aperture of said plurality of harnesses.

3. An assembly according to claim 2 wherein the mushroom shaped geometry has a irregular shape.

4. An assembly according to claim 1 wherein the panel is a motor vehicle interior trim panel.

5. An assembly according to claim 1, wherein the plurality of wire harnesses are flat wire harnesses.

6. An assembly comprising:
a panel having a surface with at least one pin protruding therefrom; and
a plurality of wire harnesses having at least one aperture therethrough, wherein the plurality of wire harnesses are adjacent the surface of the panel and the pin of the panel passes through each of said at least one aperture of said plurality of wire harnesses, wherein a portion of the pin extends beyond said at least one aperture and a locking device secures the plurality of wire harnesses to the panel by engaging the portion of the pin extending beyond said at least one aperture.

7. An assembly according to claim 6 wherein the locking device has an aperture with an expandable circumference and the pin of the panel is in expanding engagement with the expandable circumference.

8. An assembly according to claim 7 wherein the panel has said at least one pin, the locking device has a plurality of apertures and the wire harnesses have said at least one aperture.

9. An assembly comprising:
a plurality of flat wire harnesses, each wire harness having at least one aperture therethrough, the plurality of harnesses having a first surface and a second surface with the plurality of harnesses sandwiched between the first surface and the second surface; and
a motor vehicle interior trim panel having a surface with at least one retainer protruding therefrom said at least one retainer passing through said at least one aperture of each wire harness in the plurality of wire harnesses, said at least one retainer extending through the first surface and extending beyond the second surface with the first surface adjacent the surface of the trim panel.

10. An assembly according to claim 9 wherein a portion of said at least one retainer extending beyond the second surface is heat staked into a head to secure the wire harnesses to the trim panel.

11. An assembly according to claim 9 wherein said at least one retainer has a distal end, the distal end extending beyond the second surface, wherein the distal end has been heat staked into a head having a mushroom shaped geometry larger than said at least one aperture of the harnesses.

12. An assembly according to claim 11 wherein the mushroom shaped geometry has a irregular shape.

* * * * *